KENNETH M. GAVER
DERK V. TIESZEN
ESTHER P. LASURE
INVENTORS

Patented Mar. 9, 1954

2,671,780

UNITED STATES PATENT OFFICE 2,671,780

PROCESSES FOR THE PREPARATION OF NEW CARBOHYDRATE COMPOUNDS AND PRODUCTS THEREOF

Kenneth M. Gaver, Columbus, Ohio, Derk V. Tieszen, Delmar, N. Y., and Esther P. Lasure, Grove City, Ohio, assignors to The Ohio State University Research Foundation, Columbus, Ohio, a corporation of Ohio Original application August 31, 1946, Serial No. 694,328. Divided and this application January 16, 1951, Serial No. 206,258

15 Claims. (Cl. 260—233.3)

This application is a division of our copending application Serial Number 694,328, filed August 31, 1946 now Patent 2,609,370.

The inventions disclosed in this application relate to new compositions of matter or compounds and to new processes for the formation of a large number of such new compounds which have been heretofore unknown. The processes described herein illustrating our invention are especially designed to produce new products from starch and ordinarily include as one of the steps the hydrolysis of an intermediate compound to produce a glucoside, a glucose, or similar compound.

In carrying out preferred embodiments of our process, we produce as intermediate products certain new compounds which we have discovered and synthesized by our processes; these intermediate products in the nature of alcoholates of starch. To designate these compounds, we have coined the word "starchate" which we define as follows: "Starchate" means and is used in this specification and in the claims hereof in the sense of a compound composed of an undetermined number of polymerized glucopyranose units wherein one or more metallic atoms or inorganic or organic radicals are substituted for the hydrogen atoms of one or more of the several hydroxyl groups of the starch unit so as to form a polymerized compound which in fact is (or is at least analogous to) an alcoholate of starch.

Prior to our invention disclosed herein a certain process had been discovered for the substitution of alkaline metals in the starch molecule to form a starchate which we will refer to hereinafter as the ammonia process and the ammonia process starchate.

Also, according to prior art methods, mono and poly-substituted products of cellulose and of simple sugars had been prepared, as for example, as described in Scherer and Hussey, Journal of American Chemical Society, 53: 2344, (1931); Schorigin et al., Berichte 69: 1713 (1936); Peterson and Barry, U. S. Patent 2,157,083, 1939; unknown British Patent 463,056 (1937); Muskat, Journal of American Chemical Society, 56: 693 (1934); and Muskat, Journal of American Chemical Society, 56: 2449 (1934). As will be demonstrated hereafter in this application, these substituted products of cellulose and of sugars are different from the products produced by our improved process. Referring again to the prior art process designated above as the "ammonia process," it may be noted that Schmid et al. (Chemical Abstracts 20: 744 (1926) and Chem. Cent. 2: 1761, (1928)) produced a monoalkali derivative of starch by treating the starch with an alkali metal in liquid ammonia. Either as a final product or as an intermediate product these investigators obtained a monoalkali compound in which it was concluded that the reaction occurred on the six position carbon in the glucose unit of the starch molecule. Other investigators obtained sodium hydroxide adsorption compounds by dissolving starch in aqueous alkali followed by alcohol precipitation or by treating starch with alkali metal alcoholates. These compounds, however, were not starchates in that the alkali metal did not enter into the starch molecule.

Likewise, if glycogen, inulin, etc. are treated in liquid ammonia with an alkali metal, a monoalkali derivative is formed which is similar to the ammonia process starchates referred to in the last paragraph. This monoalkali derivative differs essentially from the monoalkali derivative formed in the process described in application Serial No. 707,315, now Patent 2,518,135 in that the alkali metal in such ammonia process starchates is attached to the No. 6 carbon atom whereas in the monoalkali starchate described in such prior application and described herein in connection with many of the processes of our present inventions is one in which the alkali metal is attached to the No. 2 carbon atom.

Heretofore as stated above, it has been possible by known processes to form compounds in which metallic and non-metallic elements, organic radicals and/or other groups are substituted for one or more hydrogen atoms of one of the hydroxyl groups of a glucose or similar sugar. However, in the prior art processes dealing with starch it has not been possible heretofore to accurately predetermine on which of the hydroxyl groups these substituted groups might be placed nor has it been possible to form compounds in which selected predetermined groups are substituted on the various hydroxyl carbon atoms nor to form compounds which have one group substituted on one carbon atom, a second group on a second carbon atom and a third group on a third carbon atom. We can, by our new processes, form such compounds.

One of the objects of our invention is the provision of new and useful processes of forming new and useful carbohydrates from starch.

A further object of our invention is the provision of new and useful processes for forming various new products from starch.

A further object of our invention is the provision of new and useful processes for forming various new and old glucoses and glucosides.

A further object of our invention is the provision of a new and useful process of forming polysubstituted products from starch.

A further object of our invention is the provision of new and useful products formed from starch.

Further objects and features of our invention will be apparent from a reading of the subjoined specification and claims when considered in connection with the accompanying drawings showing several exemplary processes illustrating certain embodiments of our inventions.

Figure 1:
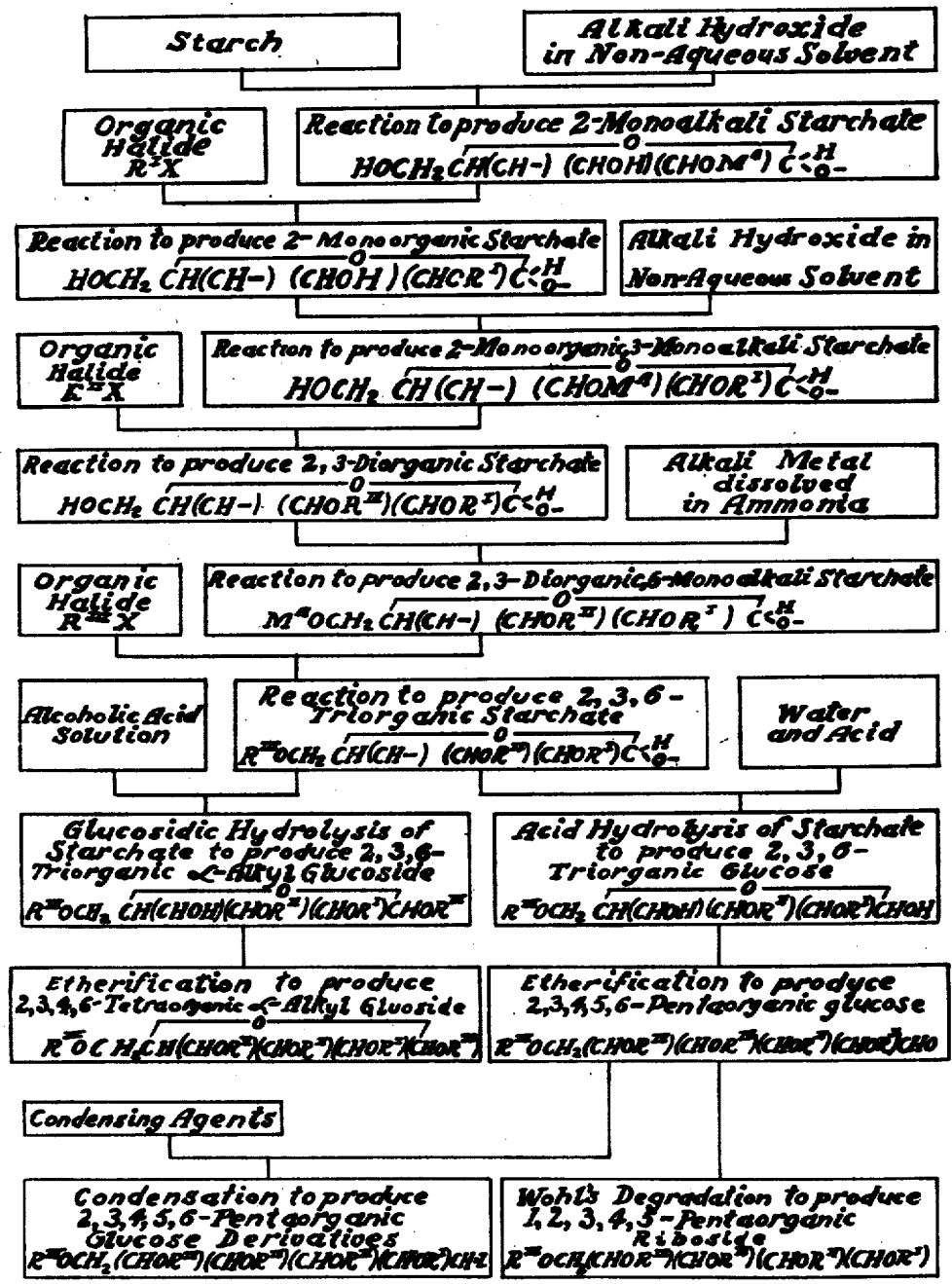
Fig. 1 is a diagram illustrating a process of forming monoalkali starchates, monoorganic starchates, starchates having one or more organic radicals and an alkali group substituted on the same gluco pyranose unit, polyorganic starchates, glucoses, glucosides, glucose derivatives, and glucoside derivatives.

In co-pending application Serial No. 357,995 now abandoned and in the continuations thereof, there are disclosed inventions relating to monometallic starchates (both alkali and nonalkali), to monoorganic starchates, and to methods for their preparation.

In co-pending application Serial No. 707,318, now Patent 2,518,135, there are disclosed inventions relating to monoalkali metal starchates, methods for their preparation, and derivatives thereof. The inventions so disclosed are based upon the discovery that when starch is reacted with alcohol soluble hydroxides (such as the hydroxides of lithium, sodium, potassium, rubidium and caesium) under certain conditions there is produced a metallic starchate wherein the alkali metal is attached through an oxygen atom to a carbon atom in the complex-glucopyranose residue (the structure commonly considered as the building unit of starch).

The starchate product formed is a glucopyranose compound. The structural formula of the unit forming the building unit of the complex starchate may be illustrated as follows wherein $M^A$ represents an alkali metal:

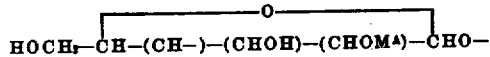

This product we will designate hereinafter in this application as a 2-monoalkali starchate.

Investigation of the 2-monoalkali metal starchate (when tested by titration and chemical reactions) definitely proves that the starch derivative formed is not an addition or coordinated compound but is a true alcoholate of starch.

In preparing the 2-monoalkali starchates referred to above, we have investigated the effect of the following factors on the reaction.

Temperatures

Any temperature from 80° C. up to 115° C. in an open or closed system, which permits the volatilization of the water produced in the reaction produces 2-monosodium starchate. If the system is closed so that the water evolved in the reaction is retained in the reaction mixture, then the reaction will yield 2-monosodium starchate at any reasonable temperature above 80° C., i. e. up to the dextrinization temperature (unknown in non-aqueous solvents but perhaps to 200° C. or higher). Somewhere above 115° C., in an open system, other reactions occur and the product is no longer 2-monosodium starchate. Under strongly dehydrating conditions, e. g. with alcoholates, this reaction can be driven to completion at temperatures lower than 80° C.

Pressure

Apparently there is but very, very slight volume changes occurring in this reaction. Pressures up to 55 lbs. have been used with no effect on the course of the reaction or upon the product produced by the reaction. It is very probable that any practical pressure may be used provided the temperature and other requirements are not violated.

Time of reaction

The time of reaction varies with the solvent chosen. With ethyl alcohol any time beyond two hours does not alter the course of the reaction nor the character of the product. With butanol, the reaction is complete by the time the butanol (technical grade) reaches the boiling point of 115° C. A generalization may be made in that the reaction is completed within two hours at 80–81° C. or instantaneously at 115° C. or higher regardless of the nature of the solvent. Any temperature between 80° C. and 115° C. would require a proportionate reaction time (e. g. at 100° C. the time required is about 75 min. and at 110° C. the time required is about 15 min., etc.).

Alkali concentration

It has been repeatedly demonstrated that the reaction is independent of alkali concentration and the same product is always obtained provided there is sufficient alkali present to satisfy the requirements of the product. At the lower temperature range, i. e. 80° C., it is advisable to use an excess of alkali in order to complete the reaction in the two hour period. At the higher temperature range, i. e. 115° C., or higher only an amount of alkali approaching stoichiometric equivalent is necessary. The mother liquor from the latter reaction always shows a faint alkalinity approximating 0.04 N. This alkalinity apparently arises from the protein-alkali interaction product extracted from the starch. The protein is known to be extracted from the starch and appears in the mother liquor.

Nature of the alkali

Of the alkalies only ammonia failed to react. Sodium and potassium hydroxide, sodium methylate, sodium ethylate, sodium propylate and sodium butylate all yield chemically similar products. Any caustic alkali or alkaline reacting material having an ionization constant of $2 \times 10^{-8}$ or greater will react provided that it is more than very slightly soluble in the chosen reaction media and also provided that the molecular size of the reacting molecule is not too large to locate itself in position to react with the starch.

*Mechanism of the reaction*

1. Water is evolved in the reaction and the amount of the water liberated is exactly chemically equivalent to the amount of alkali reacting with the starch to produce the 2-monoalkali starchate. The proven over-all reaction is $$(C_6H_{10}O_5) + NaOH \rightarrow (C_6H_9O_5Na) + H_2O$$

2. Starch readily adsorbs alkalies and such adsorption complexes were isolated and characterized by Karrer, Pringsheim and others. This was verified in our laboratory. At room temperature or even nearly up to 79° C., either in water, in alcohols or in other solvents exerting some solvent action towards alkalies the following reaction usually occurs:

$$(C_6H_{10}O_5) + NaOH \rightarrow (C_6H_{10}O_5.NaOH)$$

Such adsorbed alkalies are readily lost to give the adsorption compounds analyzing to be diamylates, triamylates, etc.

Portions of our inventions are based on the fact discovered by us that on heating, in a system which aids the removal of water either by dilution, by evaporation, or by reaction, this complex can be decomposed into the compound claimed and water as:

$$(C_6H_{10}O_5.NaOH) \xrightarrow{81°\ C.} (C_6H_9O_5Na) + H_2O$$

As stated above prior hereto this complex had been formed. However, no one had heretofore converted the complex to a starchate. In order to do so, it is necessary to separate the complex out of the solution (at least remove the water from the complex) and then in heating to 81° C., make provision for removal of water as stated above either by dilution, evaporation or reaction. Dilution is obtained by using solvents; distillation or evaporation removes water from the reaction mixture; and reaction removes water by absorption. For example, by the use of sodium alcoholate the water is removed to produce more alcohol and alkali as:

$$NaOC_2H_5 + H_2O \rightarrow NaOH + C_2H_5OH,\ etc.$$

3. The position of reaction is on C-2, 2-monosodium starchate reacts easily with methyl iodide at temperatures of 80° C. or higher to yield 2-monomethyl starchate.

$$(C_6H_9O_5Na) + CH_3I \rightarrow (C_6H_9O_5CH_3) + NaI$$

This 2-monomethyl starchate may then be hydrolyzed to yield 2-monomethyl glucose.

$$(C_6H_9O_5CH_3) + H_2O \xrightarrow{H^+} C_6H_{11}O_5CH_3$$

4. A substance analyzing to be monosodium starchate may be prepared using liquid ammonia and metallic sodium but this compound is different and distinct from the one heretofore described as is shown by the following:

1.

$$2(C_6H_{10}O_5) + 2Na \xrightarrow{NH_3} 2(C_6H_9O_5Na)\ \text{(6-monosodium starchate)}$$

2.

$$(C_6H_9O_5Na) + CH_3I \rightarrow (C_6H_9O_5CH_3)\ \text{(6-monomethyl starchate)} + NaI$$

3.

$$(C_6H_9O_5CH_3) + NaOH \xrightarrow[\text{alcohol}]{80°\ C.} (C_6H_8O_5CH_3Na)\ \text{(6-monomethyl, 2-monosodium starchate)} + H_2O$$

4.

$$(C_6H_8O_5CH_3Na) + CH_3I \rightarrow C_6H_8O_5(CH_3)_2\ \text{(2,6-dimethyl starchate)} + NaI$$

5.

$$2C_6H_8O_5(CH_3)_2 + 2Na \rightarrow 2C_6H_7O_5(CH_3)_2Na\ \text{(2,6-dimethyl, 3-monosodium starchate)} + H_2$$

6.

$$C_6H_7O_5(CH_3)_2Na + CH_3I \rightarrow C_6H_7O_5(CH_3)_3\ \text{(2,3,6-trimethyl starchate)} + NaI$$

Reaction 1 above goes only as indicated. In contrast to cellulose and other carbohydrates, starch yields only a monosodium starchate when treated with metallic sodium in liquid ammonia. The position occupied by the sodium was blocked in reaction 2 so that it would not be available for reaction with the process previously described herein. However, when the product of reaction 2 above was subjected to the reaction previously described herein, the same reaction proceeded smoothly and completely to its limit as indicated in reaction 3 above. The position occupied by the sodium of reaction 3 was blocked by methylation in reaction 4. When the product was again subjected to metallic sodium in liquid ammonia (reaction 5 above) a second hydroxyl group is reacted which when methylated yields a trimethyl starch in reaction 6 above.

If, however, we reverse the order of above reactions we have:

1.

$$(C_6H_{10}O_5) + NaOH \xrightarrow[\text{alcohol}]{80°\ C.} (C_6H_9O_5Na)\ \text{(2-monosodium starchate)} + H_2O$$

2.

$$(C_6H_9O_5Na) + CH_3I \rightarrow (C_6H_9O_5CH_3)\ \text{(2-monomethyl starchate)} + NaI$$

3.

$$(C_6H_9O_5CH_3) + 2Na \xrightarrow{NH_3} (C_6H_7O_5CH_3Na_2)\ \text{(2-monomethyl, 3,6-disodium starchate)} + H_2$$

4.

$$(C_6H_7O_5CH_3Na_2) + 2CH_3I \rightarrow C_6H_7O_5(CH_3)_3\ \text{(2,3,6-trimethyl starchate)} + 2NaI$$

It is obvious that the non-aqueous sodium hydroxide reaction is concerned with a position which is not involved in the reaction with metallic sodium and liquid ammonia.

Referring now to the diagrams of the drawings and especially to Fig. 1 for a detailed description of some of the processes of our inventions, it may be seen that in the illustrated process, we react starch with an alkali hydroxide in a non-aqueous solvent as is fully described above. The alkali hydroxide may be sodium hydroxide, potassium hydroxide, rubidium hydroxide, caesium hydroxide or lithium hydroxide. Ammonia hydroxide is unsuitable. The non-aqueous solvent may be any solvent other than water which will dissolve sodium hydroxide to the extent of 0.04N or higher. We have tested and found that the following solvents are all satisfactory and we have found no non-aqueous solvent which is unsatisfactory.

Solvents used

It has been found that any of the following alcohols may be used to prepare monosodium starchate provided that certain other variables are sufficiently controlled as will be discussed later. It must be understood that not all these mentioned have the same utility in the process. However, any solvent which will dissolve NaOH, even in small amounts, is a suitable vehicle in which to carry out the reaction provided that certain other variables are sufficiently controlled.

Alcohols which may be used

Allyl
Iso-amyl
N-amyl
Sec.-amyl
Tert.-amyl
Anisyl
Benzhydrol
Benzoylcarbinol
Benzyl
2,3-Butanediol
n-Butyl
Iso-butyl
Sec.-butyl
Tert.-butyl
Sec. butyl carbinol
β-(p-Tert. butyl phenoxy) ethyl
Capryl
Ceryl
Cetyl
3-chloro-2-propenol-1
Cinnamic
Crotyl
Cyclohexanol
Decyl
Diacetone
Diethyl carbinol
Dimethyl benzyl carbinol
Dimethyl ethynyl carbinol
Dimethyl n-propyl carbinol
Dimethyl isopropyl carbinol
Di-n-propyl carbinol
Di-iso-propyl carbinol
Ethyl
2-ethyl butyl
2-ethyl hexanol
Furfuryl
n-Heptyl
n-Hexyl
Sec.-hexyl
Lauryl
Methallyl
Methyl
Methyl amyl
Methyl butyl carbinol
o-Methyl cyclohexanol
m-Methyl cyclohexanol
p-Methyl cyclohexanol
2-methyl pentanol-1
Methyl isopropyl carbinol
n-Nonyl
n-Octyl
Octanol-2
Phenyl-propyl
n-Propyl
Iso-propyl
Tetrahydrofurfuryl
Triethyl carbinol
Triphenyl carbinol

Various polyhydric alcohols which may also be used

Ethylene glycol
Ethylene glycol monomethyl ether
Ethylene glycol monoethyl ether
Ethylene glycol monobenzyl ether
Ethylene glycol monobutyl ether
Diethylene glycol
Diethylene glycol monomethyl ether
Diethylene glycol monoethyl ether
Diethylene glycol monobenzyl ether
Diethylene glycol monobutyl ether
Di-propylene glycol
Glycerol
Glycerol α-n-butyl ether
Glycerol α,α'-dimethyl ether
Glycerol α,γ-diphenyl ether
Glycerol α-monomethyl ether
Hexamethylene glycol
2-methyl-2,4-pentanediol
Propylene glycol
Triethylene glycol
Trimethylene glycol It is clear therefore that all non-aqueous solvents capable of dissolving the alkali to an extent comparable with the dissolving of sodium hydroxide to the extent of 0.04 N or higher are satisfactory. Step one of the process illustrated in Fig. 1 thus produces a 2-monoalkali starchate having a formula:

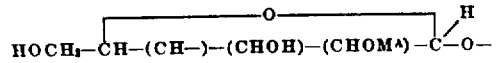

$$HOCH_2-CH-(CH-)-(CHOH)-(CHOM^A)-C-O-$$

As a second step of the process disclosed in Fig. 1, we treat the 2-monoalkali starchate formed by step 1 above with an etherifying agent. We may suspend the starchate in from 1 to 10 times the calculated quantity of an etherifying agent and heat (with pressure, if desired) to 80–81° C. for from 2 to 24 hours. By this step we obtain a 2-monoorganic starchate having a formula:

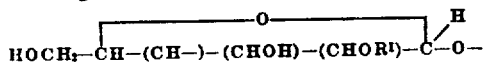

$$HOCH_2-CH-(CH-)-(CHOH)-(CHOR^1)-C-O-$$

A dispersing solvent may be used if desired but is unnecessary. The reactants may be agitated or not, as desired. Pressure may be applied or not, as desired. The 2-monoalkali starchate may be treated in other manners with the organic compounds if desired. In the drawings, as examples we have designated these reactants as organic halides, but any organic compound containing a replaceable halogen or similarly reacting group is satisfactory. For instance, dimethyl sulfate, amyl nitrite, nitro paraffins, organic phosphates, acetates, benzoates, etc. are satisfactory. As further examples of the reactants which will react with the monoalkali metal or metallic starchate to produce the corresponding 2-monoethers of such carbohydrates, the following may be mentioned:

Acetodichlorohydrin
Allyl bromide
Allyl chloride
Allyl iodide
n-Amyl bromide
Iso-amyl bromide
Iso-amyl chloride
Tert.-amyl chloride
Amylene dichloride
Iso-amyl iodide
Benzalacetophenone dibromide
Benzal chloride
Benzotrichloride
Benzyl bromide
Benzyl chloride
Bromoacetic acid
ω-Bromoaceto-β-naphthone
α-Bromo-n-butyric acid
2-bromo-1-chloropropane
Bromocyclohexane
β-Bromoethyl ether
β-Bromoethyl phenyl ether
Bromoform
2-bromo-n-octane
p-Bromophenacyl bromide
Bromopicrin
α-Bromopropionic acid
β-Bromopropionic acid
γ-Bromopropyl phenyl ether
α-n-Valeric acid
α-Bromo-iso-valeric acid
γ-Butyl bromide
Iso-butyl bromide
Sec.-butyl bromide
Tert.-butyl bromide
α,β-Dibromobutyric acid
2,3-dibromopropene
α,β-dibromopropionic acid
α,γ-dibromopropyl alcohol
3,5-dibromopyridine
α,β-Dibromosuccinic acid
Dichloroacetic acid
γ,γ'-Dichloropropyl ether
β,β'-Dichloroisopropyl ether
Epibromohydrin
Epichlorohydrin
Ethyl bromide
Ethyl bromoacetate
Ethyl α-bromo-n-butyrate
Ethyl α-bromo-n-caproate
Ethyl bromomalonate
Ethyl α-bromopropionate
Ethyl β-bromopropionate
Ethyl α-bromo-isovalerate
Ethyl chloride
Ethyl chloroacetate
Ethyl α-chloroacetoacetate
Ethyl chlorocarbonate
Ethyl β-chloropropionate
Ethyl dibromoacetate
Ethyl dibromomalonate
Ethyl dichloroacetate
Ethylene bromohydrin
Ethylene bromide
Ethylene chloride
Ethylene chlorobromide
Ethylene chlorohydrin
Ethylidene bromide
Ethylidene chloride
Ethyl iodide
Isopropyl bromide
n-Propyl chloride
Isopropyl chloride
Propylene bromide
Propylene bromohydrin
Propylene chloride
Propylene chlorobromide
Propylene chlorohydrin
s-Tetrabromoethane
s-Tetrachloroethane
Tetrachloroethylene
1,1,2-tribromoethane
Tribromoethylene
1,2,3-tribromo-2-methyl propane
1,2,3-tribromopropane
Trichloroacetic acid
Trichloro-tert.-butyl alcohol
n-Butyl chloride
Iso-butyl chloride
Sec.-butyl chloride
Tert.-butyl chloride
n-Butyl chloroacetate
Iso-butyl chlorocarbonate
α-Butylene bromide
β-Butylene bromide
Iso-butylene bromide
n-Butylidene chloride
n-Butyl iodide
Iso-butyl iodide
Sec.-butyl iodide
Tert.-butyl iodide
Cetyl bromide
Cetyl iodide
Chloral
Chloroacetamide
Chloroacetodiethylamide
Choloroacetic acid
Choloroacetone
Choloroacetonitrile
Chlorobutane
β-Chlorobutyric acid
γ-Chlorobutyronitrile
Chlorocyclohexane
β-Chloroethyl acetate
β-Chlomethyl chlorocarbonate
Chloroform
Chloropicrin
α-Chloropropionic acid
β-Chloropropionic acid
β-Chloropropionitrile
γ-Chloropropyl chlorocarbonate
Decamethylene bromide
Ethyl Trichloroacetate
Glycerol α,γ-dibromohydrin
Glycerol α,γ-dichlorohydrin
Glycerol α,β-dichlorohydrin
Glycerol α-monochlorohydrin
n-Heptyl bromide
n-Heptyl iodide
Hexachloroethane
Hexamethylene bromide
n-Hexyl bromide
n-Hexyl chlorocarbonate
n-Hexyl iodide
Iodoacetic acid
Iodoform
Lauryl bromide
Lauryl chloride
Methyl bromide
Methyl bromoacetate
Methyl β-bromopropionate
Methyl chloroacetate
Methyl chlorocarbonate
Methyl chloroform
Methyl α,β-dibromopropionate
Methyl α,β-dichloropropionate
Methylene bromide
Methylene chloride
Methylene iodide
Myristyl bromide
Methyl iodide
n-Nonyl bromide
n-Octadecyl bromide
n-Octadecyl chloride
Phenacyl bromide
Phenacyl chloride
n-Propyl bromide
2,2,3-trichlorobutyric acid
1,1,2-trichloroethane
Trichloroethylene
1,2,3-trichloropropane
Triglycol dichloride
Trimethylene bromide
Trimethylene bromohydrin
Trimethylene chloride
Trimethylene chlorobromide
Trimethylene chlorohydrin
Triphenylchloromethane
o-Xylyl bromide
m-Xylyl bromide
p-Xylyl bromide
o-Xylylene bromide
o-Xylylene chloride and similarly reacting chemicals including especially the esters.

The starchate may be dispersed with the organic compound in any suitable solvent. In addition to the solvents mentioned above, as solvents for the sodium hydroxides the following dispersing solvents may also be used:

| | |
|---|---|
| Sec.-amyl benzene | n-Octane |
| Tert.-amyl benzene | Iso-octane |
| Benzene | n-Pentane |
| n-Butyl benzene | Petroleum ether |
| Sec.-butyl benzene | Propyl benzene |
| Tert.-butyl benzene | Tetraisobutylene |
| Cumene | Tetradecane |
| Cyclohexane | Toluene |
| 2,7-dimethyl octane | Tri-isobutylene |
| Ethyl cyclohexane | Trimethyl betane |
| Heptane | Trimethylethylene |
| Hexane | 2,2,4-trimethyl pentane |
| Hexadecane | Triphenyl methane |
| Ligroin | o-Xylene |
| Methyl cyclohexane | m-Xylene |
| Nonane | p-Xylene | and various others.

The following ketones may also be used:

| | |
|---|---|
| Acetone | Methyl amyl |
| Acetophenone | Methyl butyl |
| Anisolacetone | o-Methyl cyclohexanone |
| Benzalacetone | m-Methyl cyclohexanone |
| Benzophenone | p-Methyl cyclohexanone |
| Benzoylacetone | Methyl ethyl |
| Diethyl | Methyl hexyl |
| diisopropyl | Methyl n-propyl |
| Ethyl phenyl | Methyl iso-propyl |
| Ethyl undecyl | | and various others.

The following ethers may also be used:

| | |
|---|---|
| Allyl | Benzyl ethyl |
| Allyl ethyl | Chloromethyl |
| n-Amyl | Dichloromethyl |
| Iso-amyl | Diethylene glycol diethyl |
| Anethole | Ethyl butyl |
| Anisole | Ethylene glycol dibenzyl |
| Benzyl | Ethylene glycol diethyl |
| Benzylmethyl | Ethyl |
| n-Butyl benzyl | Phenetole |
| n-Butyl | n-Hexyl |
| n-Butyl phenyl | n-Propyl |
| 1,4-dioxane | Iso-propyl |
| Di-n-propyl | | and various others.

By these various lists we do not mean to exclude the any other dispersing solvents.

As step three of the process shown in Fig. 1, we react 2-monoorganic starchate resulting from step two with an alkali hydroxide in a non-aqueous solvent in the same manner as in step one with the difference that the temperature is raised to 115° C. or higher and provision is made for the removal of water. The same solvents as are used in step one are suitable; the same alkali hydroxides are suitable. The alkaline reacting material should have an ionization constant of $2 \times 10^{-5}$ or greater in a solvent containing enough of the alkali in solution to produce 0.04 N or higher at a temperature of 115° C. There may be agitation or not as desired. The reaction should continue for a period of one hour or longer. There must however be a provision for removal of water formed in the reaction. This is most important and the provision for the removal of water together with the higher temperature distinguish this step from the requirements of step one. It is essential as stated that the water evolved in the reaction be removed as rapidly as formed and therefore only those alcohols boiling at 115° C. or more have any utility as solvents in the reaction except in special cases where some other means have been devised to remove the water. At 115° C. the water is removed by boiling or distillation. At temperatures below 115° C. special means must be provided for removing the water. This step of the process produces a 2-mono-organic, 3-monoalkali starchate, having a formula of

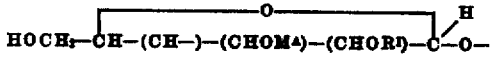

The fourth step of the illustrative process is similar to the second step. It comprises the reaction of the product of the third step with an organic reactant. This may be the same organic reactant as used in connection with the second step, or it may be a different organic reactant. It may be any one of the organic halides or similar reactants mentioned above in connection with step two. On treatment of the product, there is a reaction to produce a 2,3-diorganic starchate having a formula of

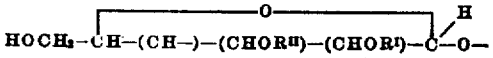

In this step, as in the preceding step, the temperature should be kept at 115° C. or higher and precautions should be taken to prevent water contamination.

The fifth step of the illustrative process comprises the reaction of the product of the fourth step with an alkali metal dissolved in ammonia. As pointed out above, this process which comprises the fifth step is a step known in the prior art. However, we combine it with the previous steps of this process and the combination becomes a new process because it involves a new combination of steps, some of which are old and some of which are new. Moreover, an entirely new product is obtained by this reaction. By it, we produce a 2,3-diorganic, 6-monoalkali starchate having a formula of

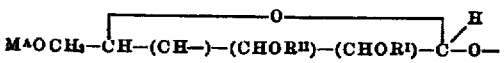

The sixth step of the illustrative process is similar to the second and fourth steps. In it we react the product of the fifth step with an organic reactant. This reactant may be the same as used in step two or the same as used in step four, or may be entirely different from the reactant used in those steps. By this sixth step reaction, we produce a 2,3,6-triorganic starchate having a formula of

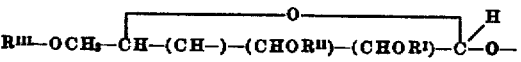

The seventh step of the illustrative process comprises the treatment of the 2,3,6-triorganic starchate produced in the sixth step with an alcoholic acid solution to obtain a 2,3,6-triorganic, α-alkyl glucoside having a formula of

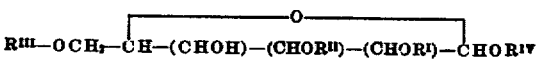

This glucosidic hydrolysis of the starchate is somewhat similar to the glucosidic hydrolysis of starch according to the prior art. However, we combine this step with the preceding new and old steps of our process into a new combination of steps. By this entirely new combination process we produce entirely new products.

The eighth step illustrated comprises an etherification of the product of the seventh step to produce a 2,3,4,6-tetra-organic, α-alkyl glucoside having a formula of

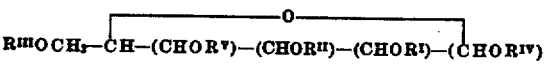

A process analogous to any one of several of the prior art processes may be used in this step in combination with our other new and old steps. For instance, prior to our invention starch has been methylated (1) by the use of methyl iodide and silver oxide, (2) by the use of di-methyl sulphate and sodium hydroxide, (3) by the use of dimethyl sulphate and barium hydroxide and (4) by the use of diazomethane. Such prior art processes are not selective but on the contrary etherify the carbon atoms indiscriminately. Similar processes however may be and are used by us to etherify the glucosides to substitute any desired organic radical on the unreacted hydroxyl groups.

Figure 2:
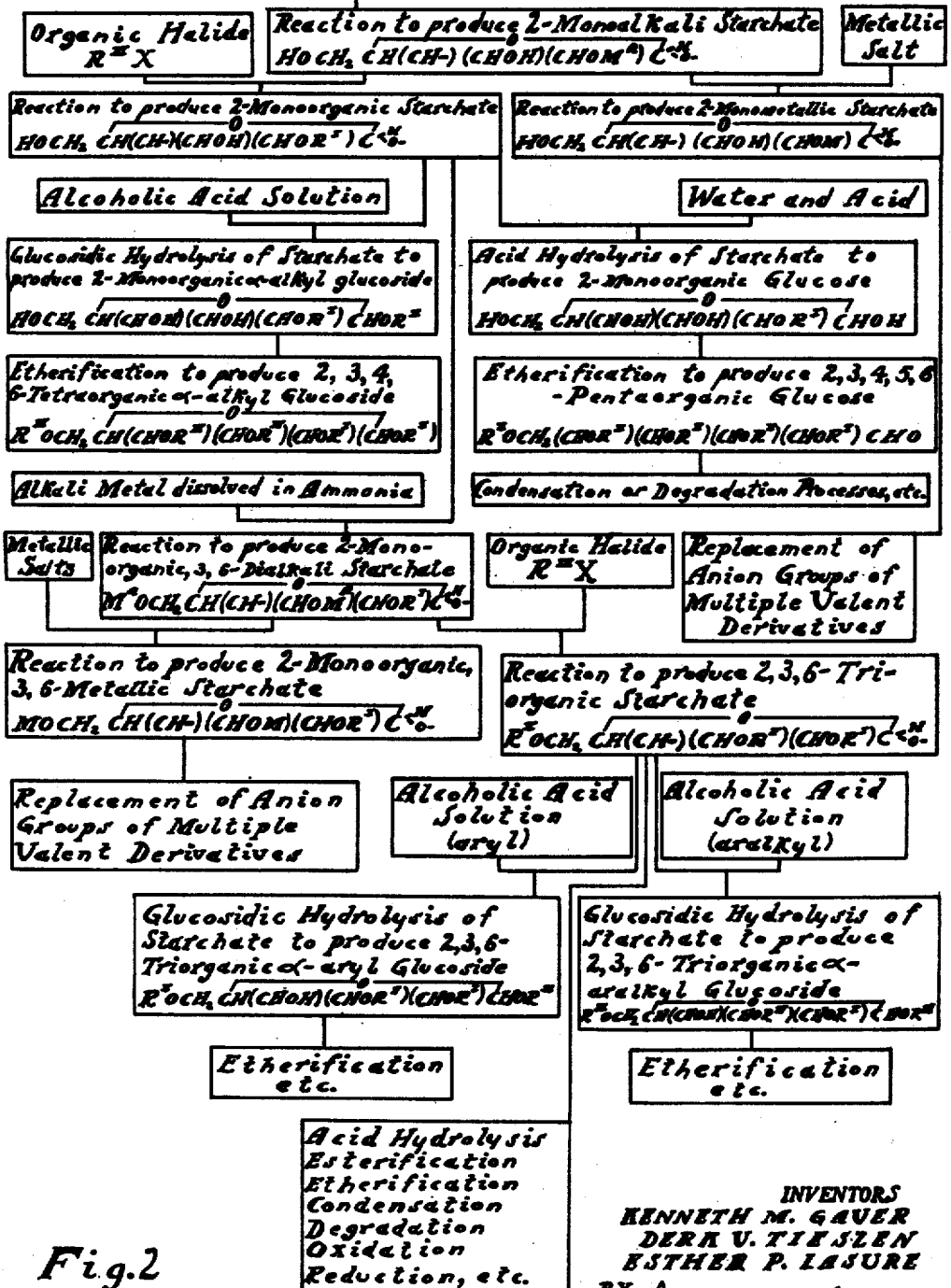
Fig. 2 is a similar diagram illustrating alternative processes to form the same and similar products and also illustrating alternative steps by which monoorganic glucoses and glucosides and their derivatives, and nonalkali monometallic starchates and mixed organic and metallic starchates and derivatives thereof may also be formed.

The processes indicated in Fig. 2 parallel to some extent those described in connection with Fig. 1. However, the order of the steps of the processes disclosed in Fig. 2 are different from the order of the steps disclosed in Fig. 1, so that some new and different products are obtained. The processes disclosed in Figs. 3 and 5 and the products of such processes are the inventions particularly covered by this application.

Figure 3:
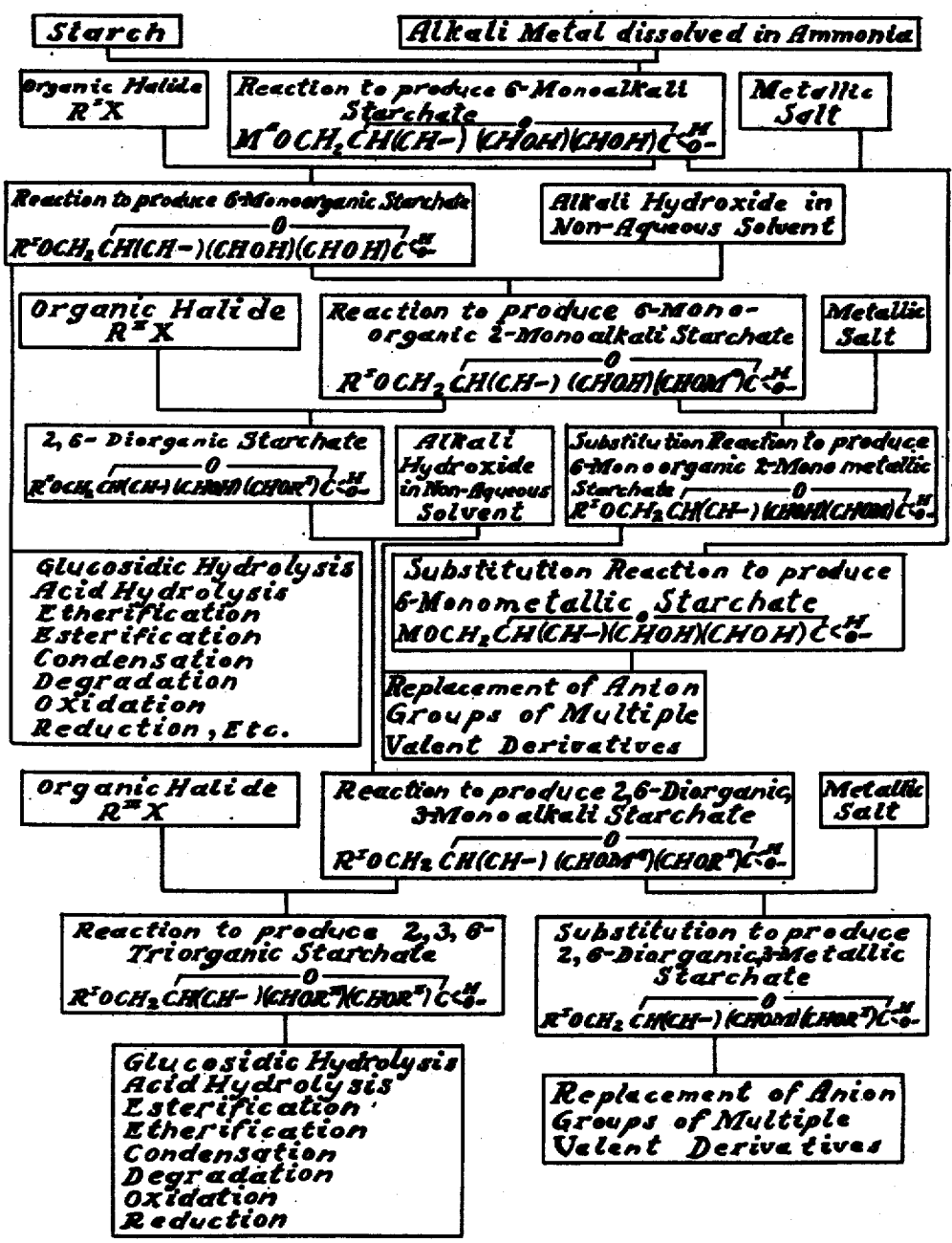
Fig. 3 is a similar diagram illustrating alternative similar processes for producing the same and similar products, the first step of which comprises the process of making ammonia process starchates.

In the processes disclosed in Fig. 3 the first step differs from the first step of the processes disclosed in Figs. 1 and 2. Although certain of the same end products may be produced either by the main process disclosed in Fig. 3 or by the main processes disclosed in Figs. 1 and 2, the processes themselves are different, some intermediate products are different and some alternative processes produce some different products. The processes of Figure 3 by reason of the change in the initial step are obviously different from the processes described in connection with Figs. 1 and 2. In the main process disclosed in Fig. 3 starch is reacted with an alkali metal dissolved in ammonia to produce a 6-monoalkali starchate having a formula of

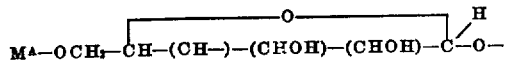

This 6-monoalkali starchate is then reacted as previously described with an organic reactant to produce a 6-monoorganic starchate having a formula of

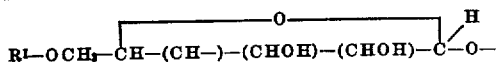

It may be noted that this 6-monoorganic starchate differs from the 2-monoorganic starchates produced by the processes disclosed in Figs. 1 and 2. This 6-monoorganic starchate is subsequently reacted with an alkali hydroxide in a non-aqueous solvent in the manner previously described in connection with the reaction of starch in step one of the processes previously described. This reaction produces a 6-monoorganic, 2-monoalkali starchate having a formula of

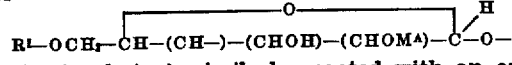

This starchate is similarly reacted with an organic reactant to produce a 2,6-diorganic starchate having a formula of

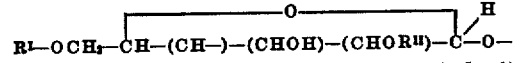

This 2,6-diorganic starchate is then reacted with an alkali hydroxide in a non-aqueous solvent. In this step, it is necessary to take adequate precautions for the removal of water and against water contamination. The temperature must be raised to 115° C. or higher so that water is driven off by distillation or other provisions made for the removal of water. The product is a 2,6-diorganic, 3-monoalkali starchate having a formula of

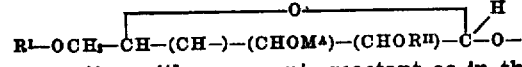

By reaction with an organic reactant as in the processes previously described a 2,3,6-triorganic starchate may be produced having a formula of

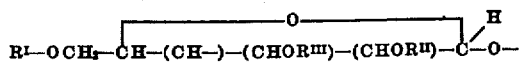

This 2,3,6-triorganic starchate may be reacted by glucosidic hydrolysis, acid hydrolysis, esterification, etherification, condensation, degradation, oxidation, reductions and so forth.

The 6-monoorganic starchate and the 2,6-diorganic starchate may also be reacted by glucosidic hydrolysis, acid hydrolysis, etherification, esterification, condensation, degradation, oxidation, reduction and so forth to produce other compounds not previously mentioned. The 6-monoalkali starchate; the 6-monoorganic, 2-monoalkali starchate; and the 2,6-diorganic, 3-monoalkali starchates may be reacted with a metallic salt to produce corresponding monometallic starchates which may be further reacted by the replacement of the anion groups of multiple valent derivatives.

Figure 4:
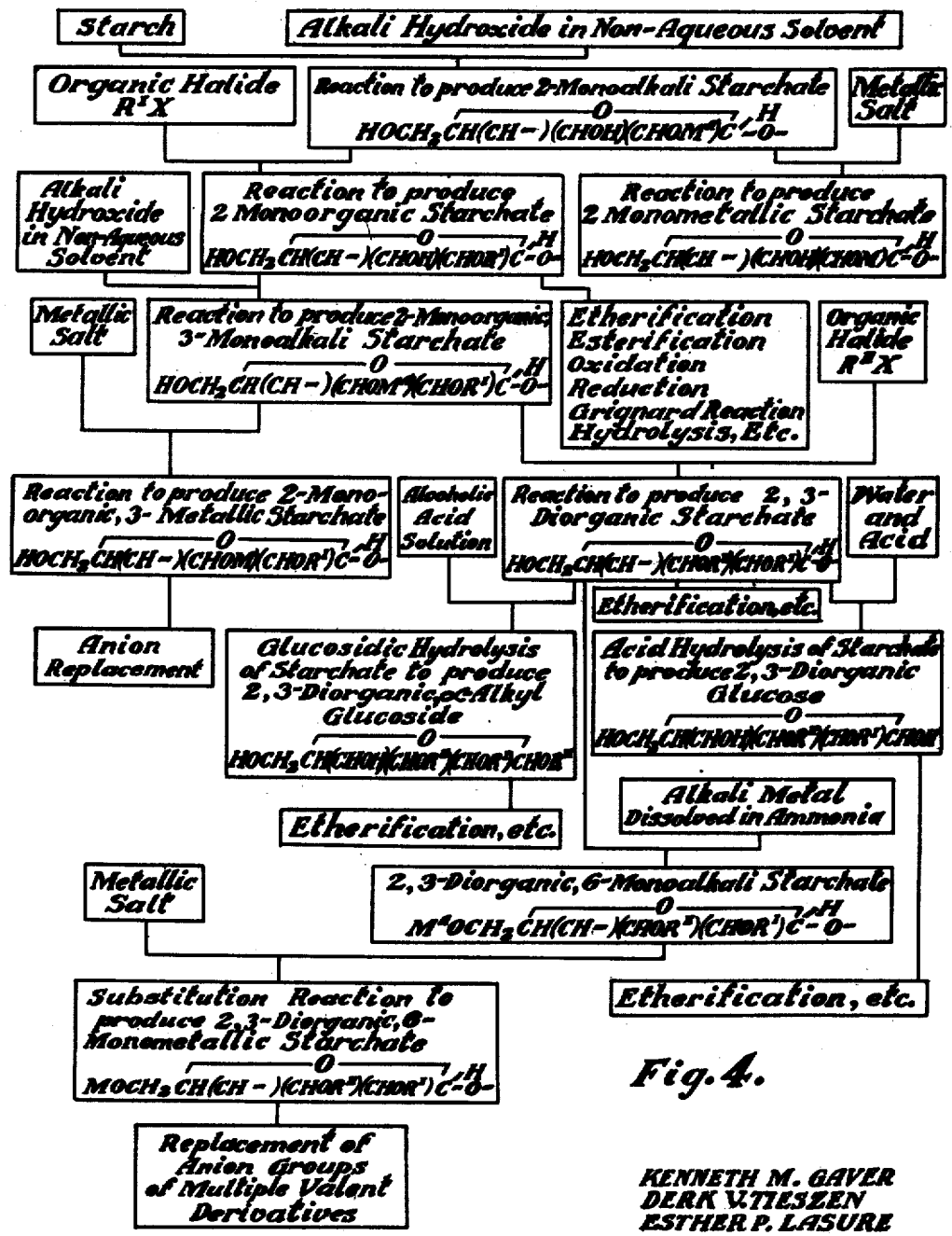
Fig. 4 is a similar diagram illustrating alternative processes for producing similar products and disclosing among other new processes, new processes of producing mono and diorganic glucoses and glucosides.

The processes disclosed in Fig. 4 are similar in many respects to those disclosed in the first portion of Fig. 1.

However, alternative processes disclosed in Fig. 4 are different from any of the processes previously disclosed in connection with Figs. 1, 2 and 3. Thus we show that the 2-monoalkali starchate may be reacted with a metal salt to produce a 2-monometallic starchate having a formula of

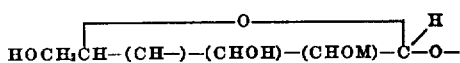

The 2-monoorganic, 3-monoalkali starchate may be reacted with a metallic salt to produce a 2-monoorganic, 3-metallic starchate having a formula of

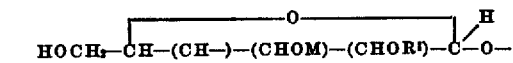

The 2,3-diorganic 6-monoalkali starchate may be reacted with a metallic salt to produce a 2,3-diorganic 6-metallic starchate having a formula of

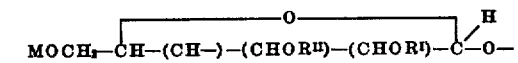

Figure 5:
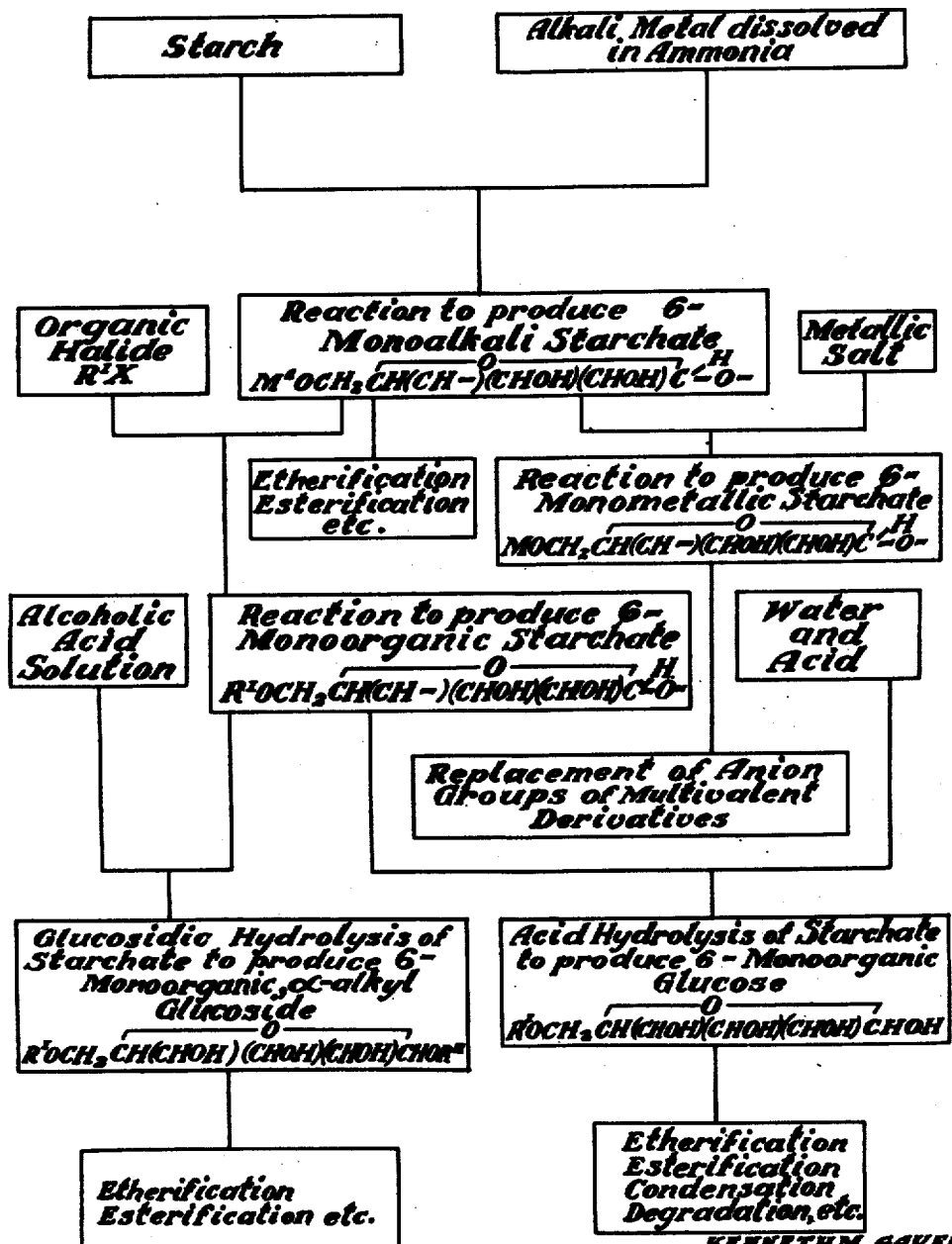
Fig. 5 is a similar diagram illustrating the process of producing 6-monoorganic glucoses and 6-monoorganic α-glucosides and derivatives thereof.

The first two steps of the main process disclosed in Fig. 5 are the same as the first two steps of the process described in connection with Fig. 3. Thus starch is reacted with an alkali metal dissolved in ammonia to produce a 6-monoalkali starchate and this 6-monoalkali starchate is then reacted with an organic reactant to produce a 6-monoorganic starchate. The 6-monoorganic starchates may be then subjected to glucosidic hydrolysis of the starchate to produce 6-monoorganic, α-alkyl glucosides (or 6-monoorganic, α-aral glucosides, or 6-monoorganic, α-aralkyl glucosides) having formulas of

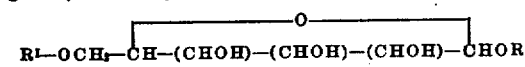

These glucosides may be then further reacted by etherification and so forth. Or the 6-monoorganic starchates may be reacted with water and acid to effect acid hydrolysis of the starchates to produce 6-monoorganic glucoses having formulas of

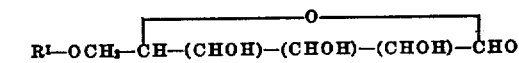

These glucoses may be further reacted by etherification, condensation, degradation and so forth.

Moreover, the 6-monoalkali starchates may be reacted with a metallic salt to produce 6-monometallic starchates having a formula of

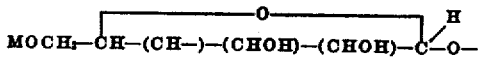

These 6-monometallic starchates may be further modified by the replacement of anion groups of multiple valent derivatives.

Above in connection with Figures 2, 3, 4 and 5 we have described the replacement of alkali metals with non-alkali metals by reaction of the alkali starchates with metal salts. In each of the cases specified we can, if we wish, use a non-metal inorganic salt as the reactant instead of a metal salt and obtain instead of the non-alkali metal starchates described in connection with said Figures 2, 3, 4 and 5 corresponding non-metal inorganic starchates. Thus in fact we can react the alkali metal starchates with any salt, organic or inorganic, metal or non-metal and obtain corresponding organic or inorganic, metal or non-metal starchates.

From the above it will be clear that it is impossible to give examples of the synthesizing of all of the products possible by our improved process or even to give examples of all of the hundreds of products which we have actually synthesized.

Following are examples of the synthesis of various products by the use of processes of our invention.

Inasmuch as certain steps of the procedures involved in many of the examples were identical or substantially identical, we set out now a series of directions or procedures which are followed in performing such steps. These directions or procedures are designated as Procedures 1–13, inclusive and in each of the examples, we have merely stated that certain of these procedures were employed. Thereby we have not only reduced the work of writing out the examples but have also, we believe, presented the examples in a manner by which they may be more readily understood. Following are the thirteen procedures referred to.

PROCEDURE 1

*Preparation of 2-sodium starchate*

In a 1000 ml. three-necked flask fitted with an efficient agitator and a thermometer place the following:

100 grams of starch
22 grams of sodium hydroxide
500 ml. butanol

Heat this mixture to 85° C. for 2 hours with vigorous agitation. Filter on suction, wash with butanol and then with toluene. The product, at this stage can be used directly in Procedure 4. The product may, however, be dried to produce 2-sodium starchate. The 2-sodium starchate must be protected from moisture and carbon dioxide during filtration, processing and drying. Drying can be best effected in a vacuum at temperatures below 100° C.

PROCEDURE 2

*Preparation of 2,3-disodium starchate (or 3-sodium starchate if C-2 is occupied by an organic radical)*

In a 1000 ml. Claissen flask fitted with an efficient agitator and a thermometer place the following:

100 grams of starch
40 grams of sodium hydroxide
750 ml. butanol

Slowly distil with vigorous agitation until the distillation temperature ceases to rise (or when the temperature reaches 118° C.). Filter hot with elaborate precautions to avoid contamination by moisture and wash twice with anhydrous butanol then with anhydrous toluene.

The product, at this stage, can be used directly in Procedure 4. The dry product is unstable.

If C-2 is occupied by R then the amount of sodium hydroxide should be cut to 20 grams.

PROCEDURE 3

*Preparation of 6-sodium starchate (or on any free hydroxyl group with the exception of native starch in which case it is only on C–6)*

In a 1000 ml. three-necked flask fitted with an efficient agitator, an ammonia inlet and a stopper, and immersed 2 inches in a Dry Ice-acetone bath, place the following:

Pass dry ammonia gas into the flask until 500 ml. of liquid ammonia have been condensed. Introduce 25 grams of dry starch which soon disperses in the liquid ammonia under the influence of agitation. Add sodium wire piece-wise until the mixture turns blue (3.5 to 3.7 grams). The excess sodium, indicated by the blue color, may be destroyed by small amounts of carbon dioxide.

The ammonia is removed by evaporation and the product may be used directly in Procedure 4.

PROCEDURE 4

*Etherification according to the reaction* $RONa + R^IX \rightarrow ROR^I + NaX$ The sodium starchate prepared according to Procedure 1, 2 or 3 is suspended in anhydrous toluene according to the following:

100 grams of starch (converted into the sodium starchate)
200 ml. toluene
100 ml. of the organic halide This mixture is placed in a 1000 ml. bomb (preferably glass lined), sealed tight and autoclaved at 100° C. for about four hours.

The supernatant liquid is decanted (or filtered) off and the product repeatedly extracted hot with an anhydrous alcohol of relatively low molecular weight to remove the NaX formed. This purified product is then washed with anhydrous toluene and then dried.

PROCEDURE 5

*Glucosidic hydrolysis*

In a 2000 ml. three-necked flask fitted with an efficient agitator, a thermometer and a reflux condenser, place the following:

1500 ml. anhydrous alcohol (according to the glucoside desired)

Pass in dry HCl gas until the solution becomes 0.5% HCl and then add 100 grams starch (converted into the starch ether)

Reflux with agitation until the optical rotation becomes constant (48 hours). The acidity of the solution should be checked periodically so that an acidity of 0.25 to 0.50% may be maintained. At the completion of the hydrolysis the solution is concentrated to about 300 ml. under vacuum. Any unetherified glucose will crystallize as an α-alkyl glucoside (e. g. α-methyl glucoside if methyl alcohol was used), from this solution on cooling and can be removed by filtration.

The solution is further evaporated to a sirup and the desired glucoside can be separated from the sirup according to usual chemical procedures, i. e., extraction, crystallization or fractional precipitation etc.

The product obtained is purified by recrystallization in the usual manner.

PROCEDURE 6

Acid hydrolysis

In a 2000 ml. three-necked flask fitted with an efficient agitator, a thermometer and a reflux condenser place the following:

100 grams of starch (converted into the starch ether)
1500 ml. 0.5% HCl solution Reflux with agitation until the optical rotation becomes constant (48 to 72 hours).

At the completion of the hydrolysis, add 50 grams of silver oxide and the solution is concentrated under vacuum to a volume of 500 ml. and then filtered hot through a filter aid and decolorizing carbon.

The solution is then evaporated to a sirup and taken up in alcohol whereon the polyamyloses are precipitated. The alcohol solution is then evaporated and the substituted glucoses are crystallized or separated in the usual manner.

PROCEDURE 7

Etherification according to the reaction
$$ROH + R^IX + NaOH \rightarrow ROR^I + NaX + H_2O$$

In a 100 ml. three-necked flask fitted with an efficient agitator, a thermometer and a reflux condenser, place the following:

100 grams of starch (converted into the derivative)
750 ml. 20% sodium hydroxide
100 ml. organic halide Heat this mixture at 95 to 105° C. for four hours with vigorous agitation. Neutralize the reaction mixture with HCl (1:1) and concentrate to a sirup under a vacuum. Take up the ether in alcohol and purify in the usual manner.

PROCEDURE 8

Wohl's degradation (Cohen, part III, 4th ed., page 8, 1924)

This method is standard and consits of the following steps:
1. The aldose is treated with hydroxylamine to give the oxime;
2. It is then acetylated (Procedure 9) to remove the water and to block any unreacted hydroxyls;
3. Treatment with ammoniacal silver nitrate removes HCN to form the aldose with one less carbon.

Since the saccharides described are generally 2-substituted the pentose is found present as the glucoside at this point and may be isolated as such in the usual manner.

PROCEDURE 9

Acetylation

In a 750 ml. Erlenmeyer fitted with a finger condenser place the following:

10 grams of starch (converted into the derivative)
300 ml. acetic anhydride
30 grams fused sodium acetate Heat this mixture just below the boiling point for about 4 hours. The unreacted acetic anhydride and acetic acid formed is removed by vacuum distillation, care being taken as the mixture approaches dryness.

The reaction product is removed by extraction with appropriate solvent, recovered and purified in the usual manner.

PROCEDURE 10

Deglucosidation

The glucoside radical may be easily removed by the standard procedure consisting essentially of allowing the glucoside to stand at room temperature with 1 N aqueous hydrochloric acid and the free aldose may be separated in the usual manner.

PROCEDURE 11

Oxidation

The glucose derivative corresponding to 100 grams of starch is dissolved in 1000 ml. 10% sulfuric acid. This mixture is placed in a 2000 ml. three-necked flask immersed in ice water. With efficient agitation 100 grams potassium permanganate is added in 5 gram portions. At no time is the temperature allowed to rise over 20° C. At the end of the reaction period (about 2 hours) the excess $KMnO_4$ is destroyed by a stream of sulfur dioxide. The acid solution is neutralized with barium carbonate and the solution evaporated to dryness. The barium salt of the gluconic acid is extracted with alcohol and the product finished in the usual manner.

PROCEDURE 12

Reduction

The glucose derivative obtained from 100 grams of starch is dissolved in 1000 ml. of 10 N methanolic KOH at 60° C. 400 ml. formalin is then added and methanol added at such a rate that the temperature remains between 60 and 70° C. When the temperature drops the mixture is heated, with agitation, and the temperature maintained at this point for 3 hours and then cooled.

The alkali is neutralized with sulfuric acid (1-5) and the mixture evaporated under vacuum to a sirup. The product is extracted with alcohol and purified in the usual manner.

PROCEDURE 13

Preparation of phenylhydrazones

The glucose derivative is converted into the phenylhydrazone by dissolving in acetic acid and then treating with phenylhydrazine base in the usual manner. Prolonged heating is to be avoided.

The crystalline hydrazone is purified by recrystallization from dilute alcohol in the usual manner.

The procedures set out in detail above (with exception of those listed as Procedures 1, 2 and 3) may be modified within wide limits without endangering the expected result.

Procedure 1 may be modified as described in copending applications but the procedure given is the one we recommend for use in conjunction with the other procedures referred to.

Procedure 2 may not be modified in any way other than relative to the alcohol used. The mixture must boil at temperatures of 118 to 135° C. Other defined conditions are required.

Procedure 3 may be modified somewhat as the requirements dictate but the procedure described has been found to be generally most satisfactory.

*Example I.—Synthesis of 2-ethyl, 3-n propyl, 6-n butyl-α-methyl-D-glucoside*

The following enumerated steps are used to prepare this glucoside.
1. Procedure 1 applied to produce 2-sodium starchate.
2. Procedure 4 applied with ethyl bromide to produce 2-ethyl starchate.
3. Procedure 2 applied to produce 2-ethyl, 3-sodium starchate.
4. Procedure 4 applied with n-propyl bromide to produce 2-ethyl, 3-n propyl starchate.
5. Procedure 3 applied to produce 2-ethyl, 3-n, propyl, 6-sodium starchate.
6. Procedure 4 applied with n-butyl bromide to produce 2-ethyl, 3-n propyl, 6-n butyl starchate.
7. Procedure 5 applied with methanol to produce 2-ethyl, 3-n propyl, 6-n butyl, α-methyl-D-glucoside.

*Example II. — Synthesis of 2-n butyl, 3-n propyl, 6-ethyl, α-methyl-D-glucoside*

The following enumerated steps are used to prepare this glucoside by a method consisting of a combination of steps differing from or differing in order from the steps of the method described in Example I.
1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with n-butyl bromide to produce 2-n butyl, 6-ethyl starchate.
5. Procedure 2 applied to produce 2-n butyl, 3-sodium, 6-ethyl starchate.
6. Procedure 4 applied with n-propyl bromide to produce 2-n butyl, 3-n propyl, 6-ethyl starchate.
7. Procedure 5 applied with methanol to produce 2-n butyl, 3-n propyl, 6-ethyl, α-methyl-D-glucoside.

*Example III.—Synthesis of 2-ethyl, 3-benzyl, 6-isopropyl α-methyl-D-glucoside*

The following enumerated steps are used to prepare this glucoside by a method consisting of a combination of steps differing from or differing in order from the steps of the method described in Examples 1 and 2.
1. Procedure 3 applied to produce 6-sodium starchate.
2. Procedure 4 applied with isopropyl bromide to produce 6-isopropyl starchate.
3. Procedure 1 applied to produce 2-sodium, 6-isopropyl starchate.
4. Procedure 4 applied with ethyl bromide to produce 2-ethyl, 6-isopropyl starchate.
5. Procedure 7 applied with benzyl chloride to produce 2-ethyl, 3-benzyl, 6-isopropyl starchate.
6. Procedure 5 applied with methanol to produce 2-ethyl, 3-benzyl, 6-isopropyl, α-methyl-D-glucoside.

*Example IV.—Synthesis of 2-n propyl, 3-isopropyl, 6-benzyl-D-glucose*

The following enumerated steps are used to prepare this glucose derivative.
1. Procedure 1 applied to produce 2-sodium starchate.
2. Procedure 4 applied with n-propyl bromide to produce 2-n propyl starchate.
3. Procedure 2 applied to produce 2-n propyl, 3-sodium starchate.
4. Procedure 4 applied with isopropyl bromide to produce 2-n propyl, 3-isopropyl starchate.
5. Procedure 7 applied with benzyl chloride to produce 2-n-propyl, 3-isopropyl, 6-benzyl starchate.
6. Procedure 6 applied to produce 2-n propyl, 3-isopropyl, 6-benzyl-D-glucose.

*Example V.—Synthesis of 2-methyl, 3-isopropyl, 6-n-propyl-D-glucose*

The following enumerated steps are used to prepare this glucose derivative by a method consisting of a combination of steps differing from or differing in order from the steps of the method described in Example 4.
1. Procedure 3 applied to produce 6-sodium starchate.
2. Procedure 4 applied with n-propyl bromide to produce 6-n propyl starchate.
3. Procedure 1 applied to produce 2-sodium, 6-n propyl starchate.
4. Procedure 4 applied with methyl iodide to produce 2-methyl, 6-n propyl starchate.
5. Procedure 2 applied to produce 2-methyl, 3-sodium, 6-n propyl starchate.
6. Procedure 4 applied with isopropyl bromide to produce 2-methyl, 3-isopropyl, 6-n propyl starchate.
7. Procedure 6 applied to produce 2-methyl, 3-isopropyl, 6-n-propyl-D-glucose.

*Example VI.—Synthesis of 2-n propyl, 3-methyl, 6-isobutyl-D-glucose*

The following enumerated steps are used to prepare this glucose derivative by a method consisting of a combination of steps differing from or differing in order from the steps of the method described in Examples 4 and 5.
1. Procedure 1 applied to produce 2-sodium starchate.
2. Procedure 4 applied with n-propyl bromide to produce 2-n propyl bromide.
3. Procedure 2 applied to produce 2-n propyl, 3-sodium starchate.
4. Procedure 4 applied with methyl iodide to produce 2-n propyl, 3-methyl starchate.
5. Procedure 3 applied to produce 2-n propyl, 3-methyl, 6-sodium starchate.
6. Procedure 4 applied with isobutyl bromide to produce 2-n propyl, 3-methyl, 6-isobutyl starchate.
7. Procedure 6 applied to produce 2-n propyl, 3-methyl, 6-isobutyl-D-glucose.

*Example VII.—Synthesis of 2-monomethyl-α-methyl-D-glucoside*

The following enumerated steps are used to prepare this glucoside.
1. Procedure 1 applied to produce 2-sodium starchate.
2. Procedure 4 applied with methyl iodide to produce 2-methyl starchate.

3. Procedure 5 applied with methanol to produce 2-methyl-α-methyl-D-glucoside.

*Example VIII.—Synthesis of 6-monomethyl-α-methyl-D-glucoside*

The following enumerated steps are used to prepare this glucoside.
1. Procedure 3 applied to produce 6-sodium starchate.
2. Procedure 4 applied with methyl iodide to produce 6-methyl starchate.
3. Procedure 5 applied with methanol to produce 6-methyl-α-methyl-D-glucoside.

*Example IX.—Synthesis of 2-methyl, 6-ethyl-α-n propyl-D-glucoside*

The following enumerated steps are used to prepare this glucoside.
1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with methyl iodide to produce 2-methyl, 6-ethyl starchate.
5. Procedure 5 applied with n-propanol to produce 2-methyl, 6-ethyl-α-n propyl-D-glucoside.

*Example X.—Synthesis of 2-methyl, 3-ethyl-α-n propyl-D-glucoside*

The following enumerated steps are used to prepare this glucoside.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 5 applied with n-propanol to produce 2-methyl, 3-ethyl-α-n propyl-D-glucoside.

*Example XI.—Synthesis of 2-methyl, 3-benzyl, 6-n propyl-α-phenyl-D-glucoside*

The following enumerated steps are used to prepare this glucoside.
1. Procedure 3 applied to produce 6-sodium starchate.
2. Procedure 4 applied with n propyl bromide to produce 6-n propyl starchate.
3. Procedure 1 applied to produce 2-sodium, 6-n propyl starchate.
4. Procedure 4 applied with methyl iodide to produce 2-methyl, 6-n propyl starchate.
5. Procedure 7 applied with benzyl chloride to produce 2-methyl, 3-benzyl, 6-n propyl starchate.
6. Procedure 5 applied with phenol to produce 2-methyl, 3-benzyl, 6-n propyl-α-phenyl-D-glucoside.

*Example XII.—Synthesis of 2-ethyl, 3-methyl, 6-isopropyl-α-benzyl-D-glucoside*

The following enumerated steps are used to prepare this glucoside.
1. Procedure 1 applied to produce 2-sodium starchate.
2. Procedure 4 applied with ethyl bromide to produce 2-ethyl starchate.
3. Procedure 2 applied to produce 2-ethyl, 3-sodium starchate.
4. Procedure 4 applied with methyl iodide to produce 2-ethyl, 3-methyl starchate.
5. Procedure 3 applied to produce 2-ethyl, 3-methyl, 6-sodium starchate.
6. Procedure 4 applied with isopropyl bromide to produce 2-ethyl, 3-methyl, 6-isopropyl starchate.
7. Procedure 5 applied with benzyl alcohol to produce 2-ethyl, 3-methyl, 6-isopropyl-α-benzyl-D-glucoside.

*Example XIII.—Synthesis of 2-methyl-D-glucose*

The following enumerated steps are used to prepare this glucose derivative.
1. Procedure 1 applied to produce 2-sodium starchate.
2. Procedure 4 applied with methyl iodide to produce 2-methyl starchate.
3. Procedure 6 applied to produce 2-methyl-D-glucose.

*Example XIV.—Synthesis of 6-methyl-D-glucose*

The following enumerated steps are used to prepare this glucose derivative.
1. Procedure 3 applied to produce 6-sodium starchate.
2. Procedure 4 applied with methyl iodide to produce 6-methyl starchate.
3. Procedure 6 applied to produce 6-methyl-D-glucose.

*Example XV.—Synthesis of 2,3-dimethyl-D-glucose*

The following enumerated steps are used to prepare this glucose derivative.
1. Procedure 2 applied to produce 2,3-disodium starchate.
2. Procedure 4 applied with methyl iodide to produce 2,3-dimethyl starchate.
3. Procedure 6 applied to produce 2,3-dimethyl-D-glucose.

*Example XVI.—Synthesis of 2,6-dimethyl-D-glucose*

The following enumerated steps may be used to prepare this glucose derivative.
1. Procedure 3 applied to prepare 6-sodium starchate.
2. Procedure 4 applied with methyl iodide to produce 6-methyl starchate.
3. Procedure 1 applied to prepare 2-sodium, 6-methyl starchate.
4. Procedure 4 applied with methyl iodide to prepare 2,6-dimethyl starchate.
5. Procedure 6 applied to produce 2,6-dimethyl-D-glucose.

*Example XVII.—Synthesis of 2-methyl, 3-ethyl, 4-butyl, 6-benzyl-α-methyl-D-glucoside*

The following enumerated steps are used to prepare this glucoside.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with benzyl chloride to produce 2-methyl, 3-ethyl, 6-benzyl starchate.
6. Procedure 5 applied with methanol to produce 2-methyl, 3-ethyl, 6-benzyl-α-methyl-D-glucoside.
7. Procedure 3 applied to produce 2-methyl, 3-ethyl, 4-sodium, 6-benzyl-α-methyl-D-glucoside.
8. Procedure 4 applied with butyl bromide to produce 2-methyl, 3-ethyl, 4-butyl, 6-benzyl-α-methyl-D-glucoside.

*Example XVIII.—Synthesis of 2-methyl, 3-ethyl, 4-butyl, 6-benzyl-α-methyl-D-glucoside*

The following enumerated steps are used to prepare this glucoside.
1. Procedure 3 applied to produce 6-sodium starchate.
2. Procedure 4 applied with benzyl chloride to produce 6-benzyl starchate.
3. Procedure 1 applied to produce 2-sodium, 6-benzyl starchate.
4. Procedure 4 applied with methyl iodide to produce 2-methyl, 6-benzyl starchate.
5. Procedure 2 applied to produce 2-methyl, 3-sodium, 6-benzyl starchate.
6. Procedure 4 applied with ethyl bromide to produce 2-methyl, 3-ethyl, 6-benzyl starchate.
7. Procedure 5 applied with methanol to produce 2-methyl, 3-ethyl, 6-benzyl, α-methyl-D-glucoside.
8. Procedure 7 applied with butyl bromide to produce 2-methyl, 3-ethyl, 4-butyl, 6-benzyl-α-methyl-D-glucoside.

*Example XIX.—Synthesis of 2-methyl, 3-ethyl, 4-butyl, 6-benzyl-α-methyl-D-glucoside*

The following enumerated steps are used to prepare this glucoside.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 3 applied to prepare 2-methyl, 3-ethyl, 6-sodium starchate.
6. Procedure 4 applied with benzyl bromide to produce 2-methyl, 3-ethyl, 6-benzyl starchate.
7. Procedure 5 applied with methanol to produce 2-methyl, 3-ethyl, 6-benzyl α-methyl-D-glucoside.
8. Procedure 7 applied with butyl bromide to produce 2-methyl, 3-ethyl, 4-butyl, 6-benzyl-α-methyl-D-glucoside.

*Example XX.—Synthesis of 2-methyl, 3-ethyl, 4,5-diacetyl, 6-butyl-D-glucose*

The following enumerated steps are used to prepare this glucose derivative.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with n-butyl bromide to produce 2-methyl, 3-ethyl, 6-n-butyl starchate.
6. Procedure 6 applied to produce 2-methyl, 3-ethyl 6-n butyl-D-glucose.
7. Procedure 9 applied with acetic anhydride to produce 2-methyl, 3-ethyl, 4,5-diaceto, 6-butyl-D-glucose.

*Example XXI.—Synthesis of 2-methyl, 3-ethyl, 4,5-diacetyl, 6-butyl-D-glucose*

The following enumerated steps are used to prepare this glucose derivative.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 3 applied to produce 2-methyl, 3-ethyl, 6-sodium starchate.
6. Procedure 4 applied with n-butyl bromide to produce 2-methyl, 3-ethyl, 6-n-butyl starchate.
7. Procedure 6 applied to produce 2-methyl, 3-ethyl, 6-n-butyl-D-glucose.
8. Procedure 9 applied with acetic anhydride to produce 2-methyl, 3-ethyl, 4,5-diaceto, 6-n-butyl-D-glucose.

*Example XXII.—Synthesis of 2-methyl, 3-ethyl, 4,5-diacetyl, 6-butyl-D-glucose*

The following enumerated steps are used to prepare this glucose derivative.
1. Procedure 3 applied to produce 6-sodium starchate.
2. Procedure 4 applied with butyl bromide to produce 6-n-butyl starchate.
3. Procedure 1 applied to produce 2-sodium, 6-n butyl starchate.
4. Procedure 4 applied with methyl iodide to produce 2-methyl, 6-n butyl starchate.
5. Procedure 2 applied to produce 2-methyl, 3-sodium, 6-n butyl starchate.
6. Procedure 4 applied with ethyl bromide to produce 2-methyl, 3-ethyl, 6-n butyl starchate.
7. Procedure 6 applied to produce 2-methyl, 3-ethyl, 6-n butyl-D-glucose.
8. Procedure 9 applied with acetic anhydride to produce 2-methyl, 3-ethyl, 4,5-diaceto, 6-n butyl-D-glucose.

*Example XXIII.—Synthesis of 2-ethyl, 3-isopropyl, 5-butyl, α-methyl-D-riboside*

The following enumerated steps are used to prepare this glucoside.
1. Procedure 3 applied to produce 6-sodium starchate.
2. Procedure 4 applied with n-butyl bromide to produce 6-n butyl starchate.
3. Procedure 1 applied to produce 2-sodium, 6-n butyl starchate.
4. Procedure 4 applied with methyl iodide to produce 2-methyl, 6-n butyl starchate.
5. Procedure 2 applied to produce 2-methyl, 3-sodium, 6-n butyl starchate.
6. Procedure 4 applied with ethyl bromide to produce 2-methyl, 3-ethyl, 6-n butyl starchate.
7. Procedure 6 applied to produce 2-methyl, 3-ethyl, 6-n butyl-D-glucose.
8. Procedure 8 applied to produce 2-ethyl, 5-n butyl, α-methyl-D-riboside.
9. Procedure 7 applied with isopropyl bromide to produce 2-ethyl, 3-isopropyl, 5-n butyl, α-methyl-D-riboside.

*Example XXIV.—Synthesis of 2-methyl, 3-ethyl, 4-isopropyl, 5-acetyl, 6-butyl, D-glucose phenylhydrazone*

The following enumerated steps are used to prepare this glucose derivative.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl iodide to produce 2-methyl, 3-ethyl starchate.

5. Procedure 3 applied to produce 2-methyl, 3-ethyl, 6-sodium starchate.
6. Procedure 4 applied with n-butyl bromide to produce 2-methyl, 3-ethyl, 6-n butyl starchate.
7. Procedure 5 applied with methanol to produce 2-methyl, 3-ethyl, 6-butyl, α-methyl-D-glucoside.
8. Procedure 7 applied with isopropyl bromide to produce 2-methyl, 3-ethyl, 4-isopropyl, 6-butyl, α-methyl-D-glucoside.
9. Procedure 10 applied to produce 2-methyl, 3-ethyl, 4-isopropyl, 6-butyl, D-glucose.
10. Procedure 9 applied to produce 2-methyl, 3-ethyl, 4-isopropyl, 5-acetyl, 6-butyl-D-glucose.
11. Procedure 13 applied to produce 2-methyl, 3-ethyl, 4-isopropyl, 5-acetyl, 6-butyl-D-glucose phenylhydrazone.

*Example XXV.—Synthesis of 2-monomethyl, 3,4,5,6-glucose tetraacetate*

The following enumerated steps are used to prepare this glucose derivative.
1. Procedure 1 applied to produce 2-sodium starchate.
2. Procedure 4 applied with methyl iodide to produce 2-methyl starchate.
3. Procedure 6 applied to produce 2-methyl-D-glucose.
4. Procedure 9 applied to produce 2-methyl, 3,4,5,6-D-glucose tetraacetate.

*Example XXVI.—Synthesis of 2-methyl, 6-ethyl gluconic acid*

The following enumerated steps are used to prepare this glucose derivative.
1. Procedure 3 applied to produce 6-sodium starchate.
2. Procedure 4 applied with ethyl bromide to produce 6-ethyl starchate.
3. Procedure 1 applied to produce 2-sodium, 6-ethyl starchate.
4. Procedure 4 applied with methyl iodide to produce 2-methyl, 6-ethyl starchate.
5. Procedure 6 applied to produce 2-methyl, 6-ethyl-D-glucose.
6. Procedure 11 applied to produce 2-methyl, 6-ethyl-gluconic acid.

*Example XXVII.—Synthesis of 2-methyl, 3-ethyl, 6-isopropyl sorbitol*

The following enumerated steps are used to prepare this glucose derivative.
1. Procedure 1 applied to produce 2-sodium starchate.
2. Procedure 4 applied with methyl iodide to produce 2-methyl starchate.
3. Procedure 2 applied to produce 2-methyl, 3-sodium starchate.
4. Procedure 4 applied with ethyl bromide to produce 2-methyl, 3-ethyl starchate.
5. Procedure 7 applied with isopropyl bromide to produce 2-methyl, 3-ethyl, 6-isopropyl starchate.
6. Procedure 6 applied to produce 2-methyl, 3-ethyl, 6-isopropyl-D-glucose.
7. Procedure 12 applied to produce 2-methyl, 3-ethyl, 6-isopropyl sorbitol.

The glucoses and glucosides produced as described above may be esterified, acetylated, sulfonated or subjected to any reaction which an alcohol group will undergo.

If an organic starchate having an organic group on the C-2 carbon or on the C-6 carbon is (instead of being subjected to glucosidic hydrolysis or acid hydrolysis) subjected to the action of various amylolytic enzymes as described in the prior art literature, only liquefaction occurs. The reducing value of the digest does not increase above that which would be expected from the unreacted glucose units. Thus it appears that no hydrolysis of the monoorganic radical takes place. Therefore there is produced a depolymerized non reducing soluble starch-like product which may be dehydrated according to the art to produce soluble starch-like products which are readily dispersible in cold water. These products are apparently very hygroscopic and very adhesive.

As stated above, inventions relating to: monometallic starchates (both alkali and non-alkali); monoorganic starchates; polyalkali starchates; polymetallic starchates (non-alkali); polyorganic starchates; and methods for the preparation of all such starchates have or will be fully disclosed and claimed in co-pending applications. Mono and poly organic non-metallic starchates, the reaction products of starch with sodium hydro-sulfide (NaSH) and sodium sulfide (Na₂S) and methods for their preparation; starch products which have been depolymerized by amylolytic enzymes (as are briefly described in the last paragraph) and methods for their preparation will also be fully disclosed and claimed in co-pending applications.

It is to be understood that the described embodiments of our invention are only illustrative and are not intended to limit the invention. The scope of the invention is defined by the following claims.

We claim:
1. A process of producing substantially uniformly substituted 2-alkali metal,6-alkyl glucopyranose polymer which comprises the steps of reacting starch by mixing it with an alkali metal dissolved in liquid ammonia; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially non-aqueous alcoholic system in which the alcohol boils at a temperature above 78° C. at 760 mm. pressure with the alkali hydroxide supplied in at least stoichiometric quantities to cause a reaction to produce the 2-alkali metal, 6-alkyl starchate.

2. The process of producing a substantially uniformly substituted 2,6-dialkyl starchate which comprises the steps of reacting starch by mixing it with an alkali metal dissolved in liquid ammonia; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali metal hydroxide supplied in at least stoichiometric quantities to cause a reaction to produce a 2-alkali,6-alkyl starchate; and reacting the 2-alkali,6-alkyl starchate by mixing it with an alkyl halide dispersed in a nonaqueous solvent at a temperature in the range of 80° C. to about 118° C. to produce the 2,6-dialkyl starchate.

3. A process of preparing a substantially uniformly substituted starch derivative comprising in combination the steps of substituting an alkali metal atom in place of the hydrogen atom of the hydroxyl group of each of a plurality of the various units comprising the starch molecule by mixing starch with an alkali metal dissolved in liquid ammonia to form a 6-alkali metal starchate; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to produce a monoalkyl-monoalkali metal starchate; reacting the monoalkyl-monoalkali metal starchate so formed by mixing it with an alkyl halide dispersed in a nonaqueous solvent at a temperature in the range of 80° C. to about 118° C. to form a polyalkyl starchate therefrom in which the substituted alkyl groups on at least two of the carbon atoms are different; and mixing the polyalkyl starchate so formed with an alkali metal hydroxide at a temperature in the range of approximately 115° C. to 118° C. in a substantially nonaqueous alcoholic system in which the alcohol boils at a temperature above 78° C. at 760 mm. pressure with the alkali hydroxide supplied in at least stoichiometric quantities to cause a reaction to produce a polyalkyl monoalkali metal starchate.

4. A process of producing a substantially uniformly substituted mixed metal alkyl starchate which comprises the steps of reacting starch by mixing it with an alkali metal dissolved in liquid ammonia; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of 80° C. to 115° C. in a substantially nonaqueous alcoholic system in which the alcohol boils at a temperature above 78° C. at 760 mm. pressure with the alkali metal hydroxide supplied in at least stoichiometric quantities to cause a reaction to produce a 2-alkali,6-alkyl starchate; reacting the 2-alkali,6-alkyl starchate with a non-alkali metal salt in a nonaqueous solvent at a temperature in the range of 80° C. to about 118° C. to produce a 2-non-alkali metal, 6-alkyl starchate.

5. A process of preparing a substantially uniformly substituted starch derivative comprising in combination the steps of substituting an alkali metal atom in place of the hydrogen atom of the hydroxyl group of each of a plurality of the various units comprising the starch molecule by mixing starch with an alkali metal dissolved in liquid ammonia to form a 6-alkali metal starchate; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to produce a monoalkyl-monoalkali starchate; subsequently reacting the monoalkyl-monoalkali metal starchate so formed by a process comprising mixing it with an alkyl halide dispersed in a nonaqueous solvent at a temperature in the range of 80° C. to about 118° C. to form a dialkyl starchate therefrom in which the substituted alkyl groups on at least two of the carbon atoms are different; mixing the dialkyl starchate so formed with an alkali metal hydroxide at a temperature in the range of approximately 115° C. to 118° C. in a substantially nonaqueous alcoholic system in which the alcohol boils at a temperature above 78° C. at 760 mm. pressure with the alkali hydroxide supplied in at least stoichiometric quantities to cause a reaction to produce a polyalkyl monoalkali metal starchate; and reacting the starchate so formed by mixing it with an alkyl halide dispersed in a nonaqueous solvent at a temperature in the range of 80° C. to about 118° C. to form a trialkyl starchate in which the substituted alkyl groups on at least two of the carbons are different.

6. A process of producing a substantially uniformly substituted alkyl glucoside which comprises the steps of reacting starch by mixing it with an alkali metal dissolved in liquid ammonia, and by mixing it with an alkyl halide dispersed in a nonaqueous solvent at a temperature in the range of 80° C. to about 118° C. to produce a 6-monoalkyl starchate; mixing the monoalkyl starchate so formed with an alcoholic acid solution to effect glucosidic hydrolysis of the starchate to produce a 6-monoalkyl glucoside.

7. A process of producing a substantially uniformly substituted glucoside which comprises the steps of reacting starch by mixing it with an alkali metal dissolved in liquid ammonia; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of 80° C. to 115° C. in a substantially nonaqueous alcoholic system in which the alcohol boils at a temperature above 78° C. at 760 mm. pressure with the alkali metal hydroxide supplied in at least stoichiometric quantities, to cause a reaction to produce a 2-alkali,6-alkyl starchate; reacting the 2-alkali,6-alkyl starchate with an alkyl halide dispersed in a nonaqueous solvent at a temperature in the range of 80° C. to about 118° C. to produce a 2,6-dialkyl starchate; mixing the dialkyl starchate so formed with an alcoholic acid solution to effect glucosidic hydrolysis of the starchate to produce a 2,6-dialkyl glucoside.

8. The process of producing a substantially uniformly substituted polyalkyl glucoside which comprises the steps of reacting starch by mixing it with an alkali metal dissolved in liquid ammonia; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali metal hydroxide supplied in at least stoichiometric quantities to cause a reaction to produce a 2-alkali,6-alkyl starchate; reacting the 2-alkali,6- alkyl starchate by mixing it with an alkyl halide dispersed in a nonaqueous solvent at a temperature in the range of 80° C. to about 118° C. to produce a 2,6-dialkyl starchate; reacting the dialkyl starchate so formed by mixing it with an alcoholic acid solution to produce by glucosidic hydrolysis a dialkyl glucoside; and esterifying the glucoside so formed to produce a 2,3,4,6-tetralkyl glucoside.

9. A process of preparing a substantially uniformly substituted starch derivative comprising in combination the steps of substituting an alkali metal atom in place of the hydrogen atom of the hydroxyl group of each of a plurality of the various units comprising the starch molecule by mixing starch with an alkali metal dissolved in liquid ammonia to form a 6-alkali metal starchate; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to produce a monoalkyl-monoalkali starchate; subsequently reacting the monoalkyl-monalkali metal starchate so formed by a process comprising mixing it with an alkyl halide dispersed in a nonaqueous solvent at a temperature in the range of 80° C. to about 118° C. to form a polyalkyl starchate therefrom in which the substituted alkyl groups on at least two of the carbon atoms are different; hydrolyzing the alkyl starchate so formed by acid hydrolysis; and esterifying the hydrolysis product with an acetyl group.

10. A process of preparing a substantially uniformly substituted starch derivative comprising in combination the steps of substituting an alkali metal atom in place of the hydrogen atom of the hydroxyl group of each of a plurality of the various units comprising the starch molecule by mixing starch with an alkali metal dissolved in liquid ammonia to form a 6-alkali metal starchate; mixing the 6-alkali metal starchate so formed with an alkyl halide dispersed in a nonaqueous solvent at a temperature in the range of 80° C. to about 118° C. to produce a 6-alkyl starchate; mixing the alkyl starchate so formed with an alkali metal hydroxide at a temperature in the range of approximately 80° C. to 115° C. in a substantially nonaqueous alcoholic system in which the alcohol boils at a temperature above 78° C. at 760 mm. pressure with the alkali hydroxide supplied in at least stoichiometric quantities to cause a reaction to produce a monoalkyl-monoalkali metal starchate; reacting the monoalkyl-monoalkali metal starchate so formed by mixing it with an alkyl halide dispersed in a nonaqueous solvent at a temperature in the range of 80° C. to about 118° C. to form a polyalkyl starchate therefrom in which the substituted alkyl groups on at least two of the carbon atoms are different; hydrolyzing the alkyl starchate so formed; and esterifying the hydrolysis product.

11. A new article of manufacture consisting of a substituted glucopyranose polymer, each of the glucopyranose units of which has a structural formula of

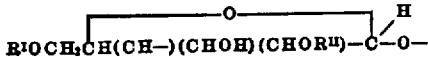

wherein each $R^I$ is an alkyl group in which the longest straight chain has not more than four carbon atoms, each $R^{II}$ is a different alkyl group in which the longest straight chain has not more than four carbon atoms.

12. A new article of manufacture consisting of a substituted glucopyranose polymer, each of the glucopyranose units of which has a structural formula of

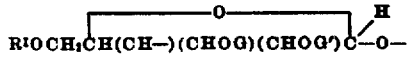

wherein each $R^I$ is an alkyl group in which the longest straight chain has not more than four carbon atoms, wherein each G is a cation selected from the group consisting of hydrogen and cations derived from metal salts and each G' is a cation selected from the group consisting of metal cations identical with the cations derived from metal salts comprising G and alkyl groups in which the longest straight chain has not more than four carbon atoms but which differ from $R^I$.

13. A new article of manufacture consisting of a substituted glucopyranose polymer, each of the glucopyranose units of which has a structural formula of

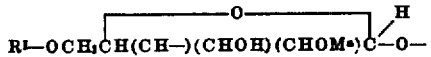

wherein each $R^I$ is an alkyl group in which the longest straight chain has not more than four carbon atoms, and each $M^a$ is an alkali metal atom.

14. A new article of manufacture consisting of a substituted glucopyranose polymer, each of the glucopyranose units of which has a structural formula of

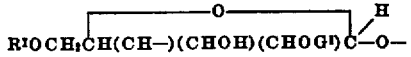

wherein each $R^I$ is an alkyl group in which the longest straight chain has not more than four carbon atoms, and each $G^I$ is a cation derived from a salt selected from the group consisting of alkyl ethereal salts of which the alkyl group has not more than four carbon atoms and metal salts.

15. A new article of manufacture consisting of a substituted glucopyranose polymer, each of the glucopyranose units of which has a structural formula of

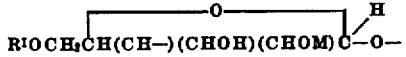

wherein each $R^I$ is an alkyl group in which the longest straight chain has not more than four carbon atoms, and each M is a metal atom.

KENNETH M. GAVER.
DERK V. TIESZEN.
ESTHER P. LASURE.

References Cited in the file of this patent

UNITED STATES PATENTS

| Number | Name | Date |
| --- | --- | --- |
| 2,397,723 | Gaver | Apr. 2, 1946 |
| 2,518,135 | Gaver | Aug. 8, 1950 |
| 2,572,923 | Gaver et al. | Oct. 30, 1951 |
| 2,609,370 | Gaver et al. | Sept. 2, 1952 |

OTHER REFERENCES

Muskat: J. Amer. Chem. Soc., March 1934, pages 693–695.

Schmid et al.: Ber., 58B, 1966–8 (1925).

Certificate of Correction

Patent No. 2,671,780                                                      March 9, 1954

Kenneth M. Gaver et al.

It is hereby certified that error appears in the printed specification of the above numbered patent requiring correction as follows:

Column 7, line 37, for "monobenyl" read *monobenzyl*; lines 50 and 51, for "hydroxxide" read *hydroxide*; column 13, line 72, for "*occuplied*" read *occupied*; column 26, line 15, for "780° C." read *78° C.*; column 27, line 7, for "esterifying" read *etherifying*;

and that the said Letters Patent should be read as corrected above.

Signed and sealed this 21st day of December, A. D. 1954.

[SEAL]

ARTHUR W. CROCKER,
                                                                                   *Assistant Commissioner of Patents.*